Sept. 9, 1941.  F. G. WAHL  2,255,200
TRANSMISSION
Filed Aug. 2, 1940  3 Sheets-Sheet 1

INVENTOR.
Frederick G. Wahl
BY
Barnes, Kisselle, Laughlin & Raisch
attorneys

Sept. 9, 1941.  F. G. WAHL  2,255,200
TRANSMISSION
Filed Aug. 2, 1940   3 Sheets-Sheet 2

INVENTOR.
BY Frederick G. Wahl
attorneys

Sept. 9, 1941.  F. G. WAHL  2,255,200
TRANSMISSION
Filed Aug. 2, 1940   3 Sheets-Sheet 3
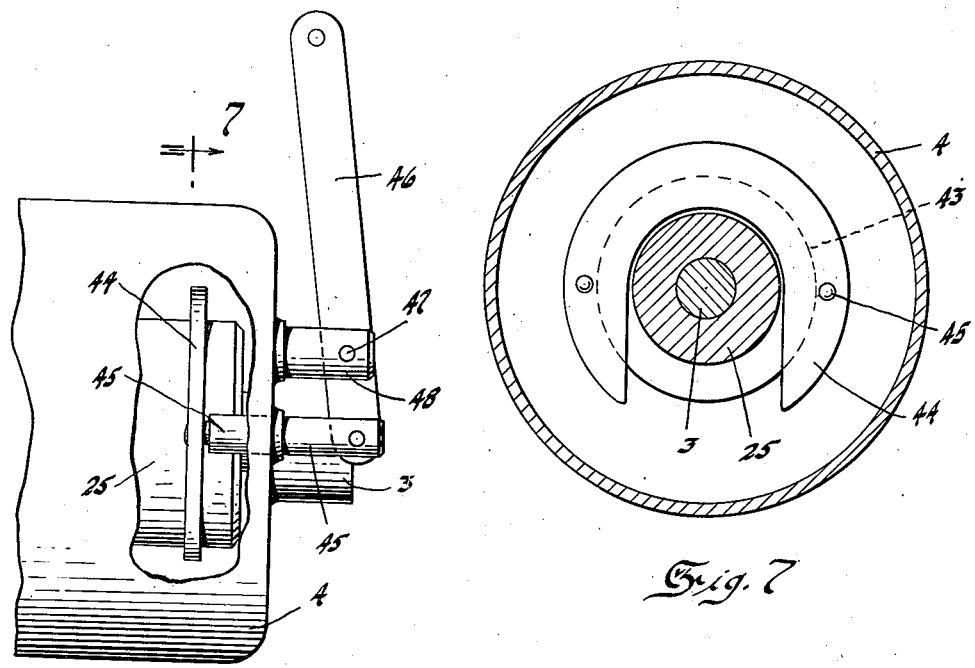
Fig. 6
Fig. 7
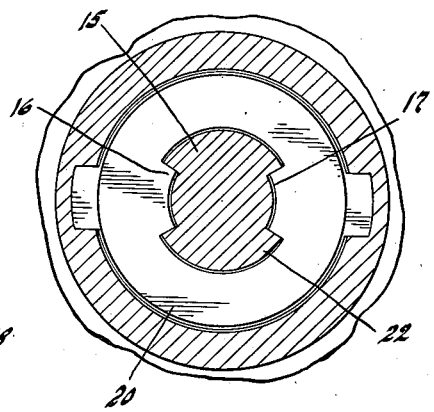
Fig. 9
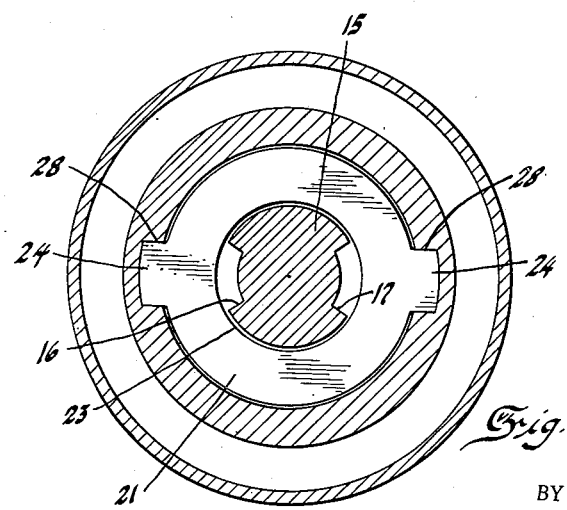
Fig. 8
INVENTOR.
Frederick G. Wahl
BY Barnes, Kisselle, Laughlin & Raisch
ATTORNEY.

Patented Sept. 9, 1941

2,255,200

UNITED STATES PATENT OFFICE 2,255,200

TRANSMISSION

Frederick G. Wahl, Detroit, Mich.

Application August 2, 1940, Serial No. 350,033

4 Claims. (Cl. 74—281)

This invention relates to a power transmitting mechanism and it has to do particularly with an arrangement where different driving ratios can be effected quickly and easily. More particularly, the invention is directed to the provision of an apparatus which embodies a plurality of torque transmitting couplings so associated that the power may be transmitted by one of the couplings and a change of couplings readily and quickly made without requiring synchronism and without any dental engagements.

Among the objects of the invention is the provision of a mechanism of this type which can be controlled automatically or by hand to change the driving ratio between driving and driven shafts. One of the couplings, for example, may be of the friction clutch type, to the end that this coupling may be quickly and silently engaged and disengaged, while another of the couplings may, and preferably does, embody rolling elements for transmitting the torque and operating on members with smooth surfaces, and wherein the rolling elements are engaged with adequate pressure between said members with the smooth surfaces for the transmission of the requisite torque. To this end the driven member may at one time be actuated as the driven member of a clutch and at another time it may be operated as a carrier member for the rolling elements. In this latter case the rotary driving member presents one surface to the rolling elements, while a fixed reaction member presents an opposing surface to the rolling elements, and this arrangement functions much in the manner of a planetary gearing, so far as the calculation of the ratios are concerned.

The drawings illustrate one form of mechanism for carrying out the invention, and this form illustrates a driving mechanism capable of producing two ratios, one of which is direct and the other of which is a reduced ratio.

In the accompanying drawings:

Fig. 6 is a vertical view of the right end of the device as illustrated in Figs. 1 and 2 with part of the housing broken away.

Fig. 7 is a section on the line 7—7 of Fig. 6.

Fig. 8 is a section on the line 8—8 of Fig. 2.

Fig. 9 is a section on the line 9—9 of Fig. 2.

Figure 1:
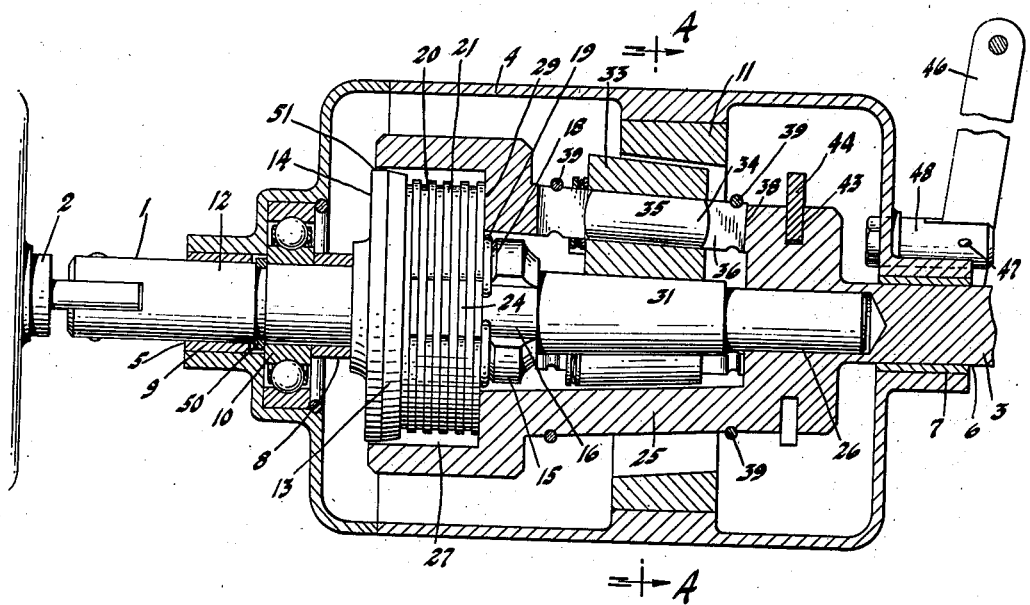
Fig. 1 is a vertical cross sectional view of a device embodying my invention shown with the parts in operative position for a direct drive of the driven shaft.

In Fig. 1 shaft 1 of the device is shown coupled to the rotatable shaft 2 of a suitable motor or power source. Shaft 3 will transmit the power to the work (not shown). The working parts are preferably enclosed within a housing 4.

Housing 4 is provided with axial openings 5 and 6 adapted to receive shafts 1 and 3 respectively. The shaft 3 is rotatably and slidably journaled in a bearing 7. The shaft 1 is provided with a thrust ring 8 adapted to take the thrust from right to left imposed upon shaft 1 when the clutch element to be hereinafter described is engaged. The thrust is transmitted from a disc 14 through ring 8 to bearing 10 and housing 4. The numeral 50 designates a small ring attached to shaft 1 and adapted to rotate between bearings 9 and 10 in which shaft 1 is journaled. It should be noted that shaft 3 and its associated parts are axially shiftable relative to the housing 4 and relative to shaft 1 and its associated parts. This will be more fully described later. Housing 4 is provided with a tapered outer race 11 which is press fitted within the housing coaxial with the shafts 1 and 3. It is adapted to cooperate with parts associated with shaft 3 in a manner to be hereinafter described.

The parts associated with shaft 1 will now be described. This shaft is provided with a journal 12, adapted to cooperate with the bearings 9 and 10. Rigidly mounted upon shaft 1 is a projection 13 which takes the form of a circular disc 14 and has, axially extending therefrom, a keyway 15. This keyway 15 is in the form of a cylinder in which two axial grooves 16 and 17 of substantial width have been cut. The circular disc 14 preferably has its periphery slightly tapered to form a guide for its entrance into a recess provided in the cooperating clutch elements to be hereinafter described. A land 51 may be provided on the left end as viewed in Fig. 1 of the periphery of the disc 14. Adjacent the end of the projection 13 which is opposite to the disc 14, is provided an annular groove 18 adapted to receive a resilient split ring 19. A plurality of substantially circular clutch plates 20 and 21 are loosely retained between the disc 14 and split ring 19. The clutch plates 20 are provided with an irregular opening 22 adapted to slidably but non-rotatably engage the keyway 15 and its grooves 16 and 17. Clutch plates 20 therefore rotate with shaft 1. Clutch plates 21 are spaced alternately with clutch plates 20 and are provided with a circular center opening 23 and are therefore rotatable relative to shaft 1. These clutch plates 21 are, however, provided with ears 24 on their periphery adapted to engage a keyway in parts associated with shaft 3 to be hereinafter described. It will therefore be apparent that clutch plates 20 rotate with shaft 1, and clutch plates 21 rotate with shaft 3 when the respective plates are disengaged.

Figure 2:
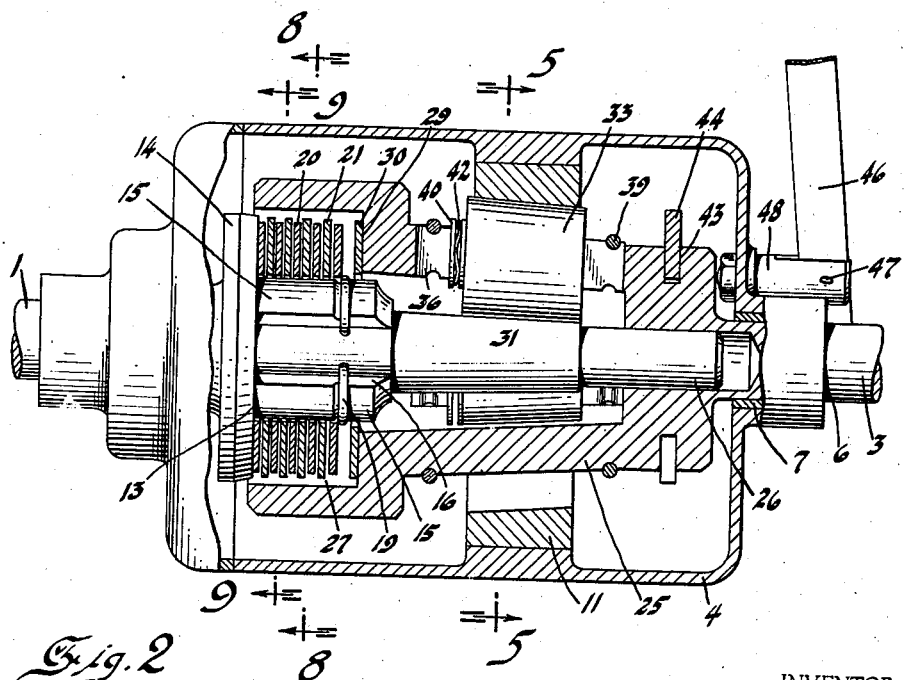
Fig. 2 is a view similar to Fig. 1 but showing the parts in operative position for a "low speed" drive.

The parts associated with shaft 3 will now be described. The shaft 3 is enlarged to form a carriage 25 which is circular in cross section and extends to a relatively large diameter at its base. The carriage 25 is provided with a hollow interior 26 adapted to receive the extending end of shaft 1. The base of the carriage 25 is provided with a cylindrical recess 27 adapted to enclose the clutch plates 20 and 21 and into which the disc 14 may penetrate. The recess 27 is provided with axial grooves 28 adapted to slidably engage the ears 24 of the clutch plates 21. The recess 27 is provided with a lateral surface 29 adapted to engage and compress the clutch plates. An additional clutch plate 30 shaped like the clutch plates 21 may be provided to contact this surface. It will therefore be apparent that when the shaft 3 is slidably moved to the left as viewed in Figs. 1 and 2 the clutch plates will be compressed between the surface 29 and the disc 14 and a direct drive will be transmitted between shaft 1, carriage 25 and shaft 3.

Figures 4, 5:
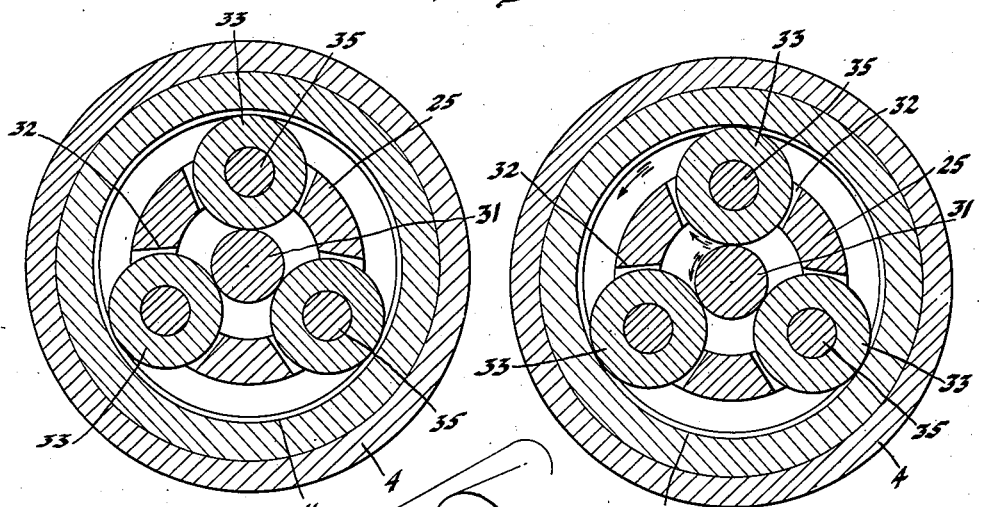
Fig. 4 is a section on the line 4—4 of Fig. 1.
Fig. 5 is a section on the line 5—5 of Fig. 2.

Means will now be described to provide an alternative driving connection of a different ratio. Provided on shaft 1 is a tapered inner race 31. Around the periphery of the carriage 25 are provided a plurality of apertures 32. Resiliently mounted in each of these apertures is a tapered roller 33 adapted to rotate on journal axles 35. While the outer race 11, inner race 31 and rollers 33 have been described as tapered, it should now be apparent that all these elements are tapered in the same direction. They are so tapered that the largest diameter of each is on the end adjacent the clutch plates 20 and 21. As viewed in Fig. 1, when the shaft 3 is slidably moved toward the right the clutch plates 20 and 21 are disengaged and the rollers 33 compressed between the tapered outer race 11 and the tapered inner race 31 (see Fig. 5). It is apparent therefore that counter-clockwise rotation of shaft 1 and inner race 31 will cause clockwise rotation of rollers 33 which will roll on the outer race 11 and through their axles 34 rotate the carriage 25 and shaft 3 in a counter-clockwise direction. Obviously the direction of rotation is immaterial. It is clear also that the relative diameters of the inner race 31, rollers 33 and outer race 11 will determine the relative speed of shaft 3 as compared to shaft 1. Satisfactory results have been obtained with the use of a device wherein the shaft 3 rotates once to every five revolutions of shaft 1.

Figure 3:
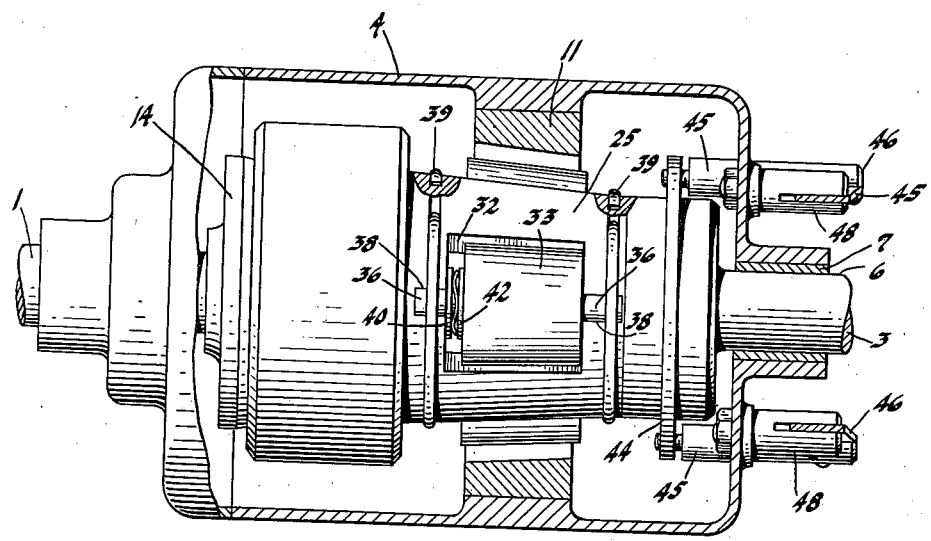
Fig. 3 is a horizontal view with the housing partly broken away.
Figure 10:
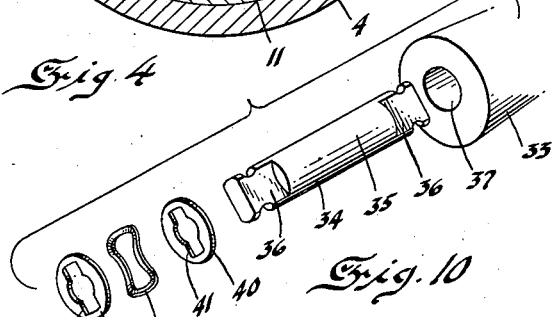
Fig. 10 is a perspective view of the parts that comprise the axle and spring means of one of the tapered rollers used in my device.

A novel means of mounting the rollers 33 in the carriage 25 has been found to be very desirable. Each roller 33 is rotatably mounted on a small axle 34 provided with a journal 35 and coplanar flattened ends 36 (see Fig. 10). Roller 33 is provided with an axial hole 37 in which the journal 35 rotatably fits. Carriage 25 is provided with additional slots 38 adjacent the apertures 32 and adapted to engage flattened ends 36 on axle 34. Split spring rings 39 yieldably hold the axles 34 in the slots 38 and thereby yieldably hold the roller 33 against inner race 31 (see Figs. 1 and 3) and overcome centrifugal force when the parts are in the position shown in Fig. 1. It is also desirable to provide an axial resilience in the roller 33 so that when it is forced between the tapered outer race 11 and tapered inner race 31 it will engage them smoothly. To this end two washers 40 provided with slots 41 are adapted to fit on flattened end 36 of the axle 34. This constitutes a slidable but non-rotatable mounting of the washers on axle 34. Loosely mounted between these washers is a small circular bent spring 42. This spring, although circular in cross section, is bent to present raised surfaces in an axial direction. It will be seen therefore that one of the washers 40 abuts the side of apertures 32 of carriage 25 and the other washer 40 abuts the roller 33. The spring 42 cushions any movement of the roller in that direction and does not interfere with rotation of the roller. Each tapered roller is thus individually acted upon axially by one of the springs 42. When the carriage with a plurality of such rollers is shifted axially to cause the rollers to engage between the inner and outer races, all the rollers are thus caused to engage the races so that each takes a portion of the load. If, for example, one roller, due to manufacturing tolerances, engages the surfaces of the races in advance of the others, it will back up against its spring, thus permitting the other rollers to come into engagement.

Means illustrated in Figs. 6 and 7 are provided to cause axial shifting of shaft 3 and its carriage 25 as previously referred to herein. Provided on carriage 25 is a peripheral groove 43. A fork 44 is adapted to vertically engage the groove 43. This engagement does not hinder rotation of carriage 25. Axially extending members 45 are fastened to fork 44 and slidably project through the end of the housing 4. A lever 46 pivoted at 47 to a stationary member 48 on housing 4 is pivotally fastened to extending member 45. Obviously, movement of lever 46 will cause movement through member 45 of fork 44 which will axially shift carriage 25 and shaft 3 to effect engagement of the respective clutch plates or rollers depending on the direction of movement of shaft 3.

In the operation of the device, the operator desiring a direct drive of shaft 3 from shaft 1 shifts lever 46 to the right as viewed in Fig. 1. This shifts shaft 3 and carriage 25 to the left and disengages the rollers 33 from between the tapered inner race 31 and tapered outer race 11. Further movement of lever 46 to the right moves surface 29 against clutch plates 20 and 21 and compresses them against disc 14, thereby causing direct drive of shaft 1 and shaft 3. Movement of lever 46 to the left shifts shaft 3 to the right and forces tapered rollers 33 between tapered inner race 31 and tapered outer race 11, thereby causing rotation of shaft 3 at a different but predetermined ratio. The relative diameters of inner race 31, rollers 33 and outer race 11 will determine the ratio.

One place of use of the device shown is in connection with a type of washing machine now on the market where, during the washing period, the driven shaft and the cylinder are operated at relatively low R. P. M., in which event the drive is through the rollers. The device may be designed to give a ratio of about 5 to 1, at which time the driven member may rotate at about 60 R. P. M. After the washing is over and the machine has conditioned itself for the drying, the lever 46, by hand or an automatic action, may be shifted to loosen the roller element and engage the clutch plate driving element thereby resulting in a 1 to 1 ratio, at which time the driven shaft may rotate at about 300 R. P. M. Of course, this is only one example of where the device may be used, as it is to be understood that so far as this invention is concerned it may be used anywhere, as for example, in the production of an over drive in an automotive vehicle.

I claim:

1. In a device for transmitting power, the combination of a driving shaft, a driven shaft, a friction clutch for effecting a drive of the driven shaft, said friction clutch being releasable by relative axial movement of the shafts in one direction, and alternate means for driving the driven shaft in the same direction comprising a fixed race element, a second race element fastened to one of said shafts, a carriage fastened to the other of said shafts, a roller element rotatably mounted in the said carriage and adapted to roll on the surfaces of the race elements whereby the driven shaft is rotated, said alternate means being releasable by relative axial movement of the shafts in a second direction.

2. In an apparatus for transmitting power at different torque and speed ratios, a combination of a driving member, a driven member, a friction clutch arranged to be engaged and disengaged for coupling the driving and driven members together when engaged; coupling means including two race members having tapered raceway surfaces and a carrier member having a plurality of rollers for engaging and operating upon the raceway surfaces, one of said members being on the driving member, a second on the driven member and a third of which is fixed; an axle member for each of the rollers on the carrier, yielding means for mounting the axle members so that they may shift radially with corresponding shift of the rollers, yielding means for holding the rollers so that each roller may shift axially of its respective axle, and control means operable to shift the friction clutch into engagement and to shift one of the members of the coupling simultaneously to effect disengagement of the rollers with the tapered raceway surfaces to establish direct driving relation between the driving and driven members, and operable to shift the friction clutch into disengagement and to cause the rollers to engage the raceway surfaces with pressure to establish a driving connection through the coupling means other than direct, the said yielding means acting on the roller axles and upon the rollers functioning to provide for substantially equal contact of all the rollers with the raceway surfaces.

3. In an apparatus for transmitting power at different torque and speed ratios, the combination of a driving member, a driven member, a friction clutch arranged to be engaged and disengaged for connecting the driving and driven members directly when engaged, said driven member having a carriage, a plurality of rollers in the carriage arranged in an annular array, an axle for each roller, yielding means mounting each axle in the carriage for radial shift with the corresponding radial shift of the respective roller, yielding means acting upon each roller for shift of each roller lengthwise of its axle against the yielding means, a fixed race member having an internal tapered raceway surface, a race member on the driving member having an external tapered raceway surface, the rollers being arranged to engage the raceway surfaces, and control means operable to shift the clutch into engagement and to shift the rollers and the raceway surfaces out of engagement for a direct drive between the driving and driven members, and operable to disengage the clutch and to force the rollers and raceway surfaces into engagement under pressure to establish a drive through the race members and rollers at a speed and torque ratio other than direct.

4. In an apparatus for transmitting power at different torque and speed ratios, the combination of a driving member, a driven member, a friction clutch arranged to be engaged and disengaged for connecting the driving and driven members directly when engaged, said driven member having a carriage, a plurality of rollers in the carriage arranged in an annular array, an axle for each roller, yielding means mounting each axle in the carriage for radial shift with the corresponding radial shift of the respective roller, yielding means acting upon each roller for shift of each roller lengthwise of its axle against the yielding means, a fixed race member having an internal tapered raceway surface, a race member on the driving member having an external tapered raceway surface, the rollers being arranged to engage the raceway surfaces, the said carriage constituting a clutch pressure member, means operable to shift the carriage to engage the clutch and to disengage the contact across the rollers and raceway surfaces to establish direct drive, and operable to shift the carriage to disengage the clutch and force the rollers between the raceway surfaces to establish a drive across the rollers at a ratio other than direct.

FRED G. WAHL.